United States Patent [19]

Katana et al.

[11] Patent Number: 4,743,773
[45] Date of Patent: May 10, 1988

[54] BAR CODE SCANNER WITH DIFFUSION FILTER AND PLURAL LINEAR LIGHT SOURCE ARRAYS

[75] Inventors: Yukio Katana; Masao Goto; Ichiro Sekiguchi, all of Tokyo, Japan

[73] Assignee: Nippon Electric Industry Co., Ltd., Tokyo, Japan

[21] Appl. No.: 768,076

[22] Filed: Aug. 21, 1985

[30] Foreign Application Priority Data

| Aug. 23, 1984 | [JP] | Japan | 59-175714 |
| Aug. 23, 1984 | [JP] | Japan | 59-127859[U] |
| Aug. 23, 1984 | [JP] | Japan | 59-127860[U] |
| Nov. 30, 1984 | [JP] | Japan | 59-182860[U] |
| Feb. 4, 1985 | [JP] | Japan | 60-14381[U] |

[51] Int. Cl.$^4$ .............................. G06K 7/10
[52] U.S. Cl. ........................ 250/566; 235/472
[58] Field of Search ............ 250/566, 568, 221, 226, 250/236; 235/472, 462; 350/452

[56] References Cited

U.S. PATENT DOCUMENTS

| 4,182,956 | 1/1980 | Funk, Jr. et al. | 250/227 |
| 4,251,798 | 2/1981 | Swartz et al. | 250/568 |
| 4,409,470 | 10/1983 | Shepard | 235/472 |
| 4,496,831 | 1/1985 | Swartz | 235/472 |
| 4,538,060 | 8/1985 | Sakai | 235/472 |
| 4,570,057 | 2/1986 | Chadima | 235/462 |
| 4,603,262 | 7/1986 | Eastman | 250/566 |

Primary Examiner—David C. Nelms
Assistant Examiner—Jessie L. Ruoff
Attorney, Agent, or Firm—Jordan and Hamburg

[57] ABSTRACT

The present invention provides a bar code scanner applicable for use to scan various bar codes of different standards and sizes. Any malfunction due to nonuniform illumination of the bar code or maloperation can be prevented, and also the light source may not be normally turned on. This bar code scanner is usable as held by hand or fixed as desired.

The opening of the scan head of the inventive bar code scanner is formed polygonal, and high light-transmission diffusion filter is provided between the light source and the opening. The light source consists of spot light sources disposed in plural linear arrays including the ones which are normally on for sensing the proximity to a bar code and the others which are turned on and off depending on whether the scan head is near or far from a bar code.

Furthermore, the scan head enclosure consists of a gripping portion for the operation of the scanner as held by hand and a flat bottom portion for use in operating the scanner as fixed; both portions are integrally formed to be the enclosure in which a light source, photodetector, decoder and interface.

6 Claims, 10 Drawing Sheets

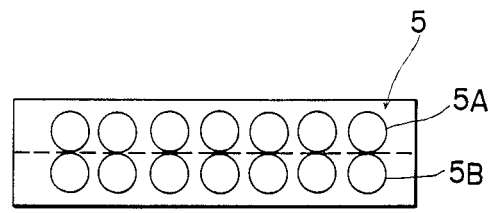
Fig.5(A)
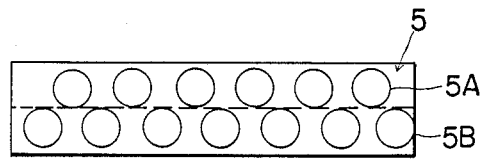
Fig.5(B)
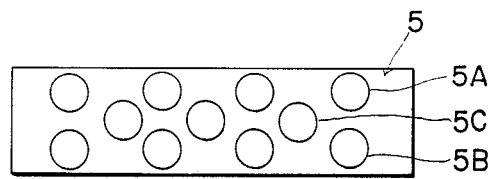
Fig.5(C)
Fig. 6
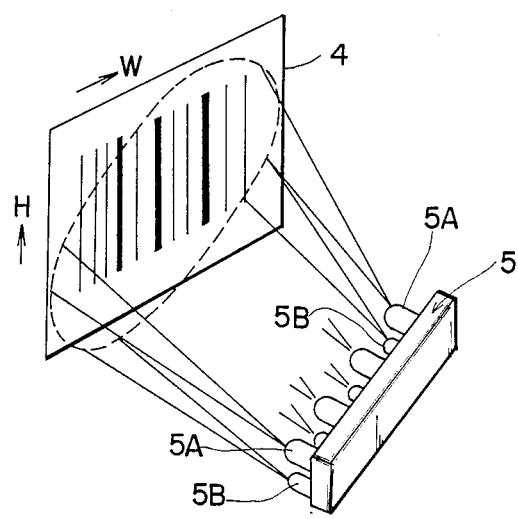

(PRIOR ART)

BAR CODE SCANNER WITH DIFFUSION FILTER AND PLURAL LINEAR LIGHT SOURCE ARRAYS

BACKGROUND OF THE INVENTION

1. Field of the Invention

The present invention relates to a bar code scanner.

2. Description of the Prior Art

Recently, for processing by computer the large volume of commodity data in each of the manufacture, storage, distribution, sales phases, etc. of commodities, identification number of a commodity has become marked on the container, package or the like of the commodity.

The bar code is generally a combination of wide and narrow bars with which figures, characters or other information are coded. The bar code is provided on the container, package or the like as printed directly there or attached in the form of a bar code label.

A bar code scanner scans the bar code optically and converts it into an electrical signal which will be sent as input to the computer for processing.

The bar code scanners are available in various types; the basic principle of all the types is projecting light to the bar code and identifying the width of each bar based on the quantity of reflected light from the bar. This bar code scanning can be done by either of the following two methods. One of the method is such that a fine beam spot is scanned perpendicularly to code bars and reflected from each bar is scanned one after another by a single photodetector element. The other method is to projecting light evenly to the bar code surface and scanning the reflected lights from the code bars simultaneously by a photodetector or CCD (character coupled device) image sensor composed of a plural photodetector elements provided correspondingly to the code bars. The present invention adopts the latter one of the above-mentioned methods.

The bar code scanner is an apparatus to receive the light reflected from or penetrating through the bar code label and recognize the data carried by the bar code, and it consists of a scan head section and a decoder section incorporating a micro processor to decode the contents of the bar code.

More particularly, bar code scanners of the above-mentioned type comprise a light source to project light evenly to the bar code surface, a lens system to converge the scattered or reflected lights on the bar code surface, a photoelectric transducer (photodetector) element to convert the light collected by the above lens system into an electrical signal, a decoder which shapes the electrical signal obtained by the above-mentioned photoelectric conversion and analyzes information from the figures and letters represented by the bar code, and an interface unit to interface the data from said decoder to an external unit (host computer). Conventionally, the above-mentioned light source, lens system and photoelectric transducer element are contained as the scan head in one enclosure while said decoder, interface unit, a power circuit, etc. are housed in another enclosure separate from the scan head. These two enclosures are connected by a cable.

A prior-art example will be described below with reference to FIGS. 10(A) and (B). As seen from these figures, a light source 100 consisting of an array of lamps or LEDs (light emitting diode) is provided at an angle with respect to an optical axis of light reception 101. The light (optical axis of light projection) 102 from the light source 100 is projected evenly onto the surface of a bar code label 103 after passing through an opening 104. The optical axis of light reception 101, namely, the reflected light from the bar code label 103 is subject to a predetermined optical process through an optical system 105, and then it is incident, through an optical path 106, upon a photodetector 107. The phtodetector 107 is a linear array of a required number of photodetector elements for the number of bars of the bar code. Each photodector elements send electrical signals obtained by photoelectric conversion in parallel to a signal processor 108.

As apparent from the above, the size of the bar code to which the bar code scanner is applicable is limited by the length of the opening 104 of the bar code scanner. The light source 100 for light projection is installed just inside the opening 104 at the end of the bar code scanner at an angle with respect to the optical axis 101 of light reception. This light source is a linear array of plural high-brightness, high-directionality LEDs disposed as regularly spaced in line in the same direction as that in which the bars of the bar code label 103 are disposed. In such light source 100, projected beams of light are overlapped on each other in a narrow range since each of the LEDs has a high directionality. The luminance distribution on the illuminated surface of the bar code label 103 is nonuniform since the brightness on the optical axis of light projection of each LED is high while that between adjoining optical axis of light projection is low. To eliminate such nonuniformity of light projection in order to attain an even luminance distribution, it has been proposed heretofore to use LEDs of wide directionality or to use a cylindrical lens or the like before the LEDs. However, such high directionality LED should be of a high brightness, and so it consumes so much electric power. Also the use of the cylindrical lens led to a complicated structure of the bar code scanner and also to correspondingly high costs.

The optical geometrical relation between the light source 100 of the bar code scanner and the bar code label 103 illuminated by the light source 100, shown in FIGS. 10(A) and (B) is shown in FIGS. 11(A) and (B). The bar code label 103 has a bar code printed on the surface thereof as shown. The light source 100 is a linear array of plural LEDs 109. Each of these LEDs 109 has a high brightness and directionality, and emits a fine beam of light. The light beams from these LEDs 109 form together a composite beam of light 110. The area 111 of the bar code label 103 onto which the composite light beam 110 is projected is indicated with a dash line. The illuminated area 111 can be extended to a desired length by disposing a required number of LEDs 109 in the disposed direction (indicated with W) of the bars of bar code. However, the lengthwise direction (indicated with H) of the bars of bar code is limited by the beam width of one LED 109. Therefore, when the bar code is wholly in the illuminated area 111 by directing the scan head correctly toward the bar code label 103 as shown in FIG. 11(A), the reflected light 112 from all the LEDs which are reflected by the bar code label 103 coincide with the optical axes of light reception 101 of the scan head, and thus the reflected light beams are picked up into the scan head through the opening 104.

However, if the light source 100 is inclined somewhat leftwise as shown in FIG. 11(B), the area 111 lighted by the composite beam of light 110 is also inclined as indicated with the dash line. As the result, the luminance of the reflected light 112 from the bar code is low, and in the worst case, the reflected light 112 is so small, like the beam at the lower left portion of FIG. 11(B), as not to be detectable by the photodetector element.

FIG. 12 is a circuit diagram of the light source 100 of the prior-art scan head, the reference numeral 113 indicating a current limiting resistor. These resistors 113 are used to supply each of as many LEDs 109 as them, being arranged as regularly spaced, with a same current so that the LEDs will always emit light.

The prior-art bar code scanners generally include stationary types and hand-held types, which are used in their respective manners. The hand-held type scan head is so designed as to start a scan with the head brought as held by hand near the bar code attached or printed on the commodity. The methods of bar code scanning include two kinds: In one method, the scan is effected by operating a switch to let the LEDs 109 in the scan head emit light with the opening of the scan head brought near the bar code label 103. In the other method, the scan is done with the LEDs always in the state of emitting light. The former method needs operation of the LED on/off switch every time the scan head is brought near the bar code and thus will cause the operator to be very tired in case a large quantity of goods is to be inspected, while the latter method will not cause the operator to be tired as in the former method, but it will consume much electric power since the LEDs are always in the state of light emission.

SUMMARY OF THE INVENTION

The present invention has a primary object to provide a bar code scanner having an end opening of scan head so formed as to permit scanning of many different bar codes from small to large and which has a simplified structure. The features of the present invention lie in the fact that the bar code scanner is easy to operate and also highly accurate as compared with the convetional bar code scanners of which the opening is simply made long enough to cover the bar code of a maximum size. Namely, it is of course that the central portion and lateral sides of the opening can be definitely discriminated by the obtuse sweep-back angle of the cover when viewed from above, and also the discrimination is possible as felt by the hand holding the scan head when the opening is in contact with the surface of a commodity on which the bar code label is attached.

According to another aspect of the present invention, a bar code scanner is provided in which a light diffusion filter of a simple structure and which permits to reduce the manufacturing costs considerably is used to give the bar code a uniform distribution of light and assure an improved accuracy of code scanning.

According to yet another aspect to the present invention, a bar code scanner is provided which has a light source which expands the area illuminated with the composite light beam formed thereby and needs no on-off operation in order to prevent as much as possible the scanner from being maloperated due to carelessness or inexperience, and which can effectively reduce the power consumption thereof.

According to still another aspect of the present invention, a bar code scanner is provided which is compact and housed in a single enclosure so that it can be used as held by hand and also as installed and that it can be operated easily.

According to yet other aspect of the present invention, linear light sources formed by plural high brightness and directionality spot light sources disposed in line are arranged in plural rows to form a plane of light source, whereby the area of bar code illuminated by composite beam is greatly expanded in the lengthwise direction of the bars of the bar code.

According to still yet other object of the present invention, the decoder is lightweight and compact as a result of using chips for the decoder circuit elements and it is housed along with the interface, etc. within the above-mentioned case, for thereby integrating the entire bar code scanner so that it is of a compact, easy-to-handle, portable structure which can be operated as held by hand and/or as installed.

BRIEF DESCRIPTION OF THE DRAWINGS

FIGS. 5(A), (B) and (C) explain the arrangement of the light source in FIGS. 4(A) and (B);

FIG. 6 is an explanatory illustration of the embodiment in FIGS. 4(A) and (B);

DETAILED DESCRIPTION OF THE PREFERRED EMBODIMENTS

Figure 1A:
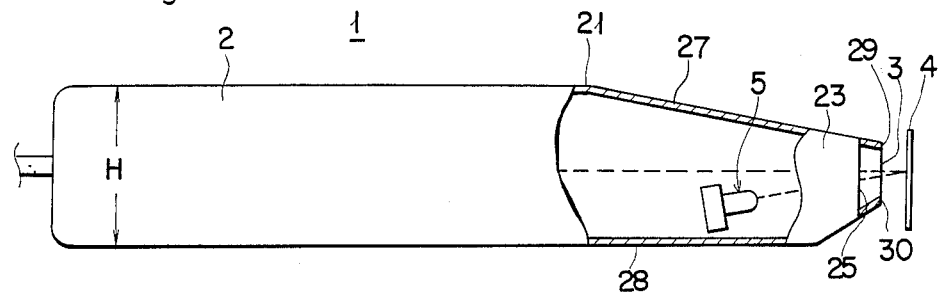
FIGS. 1(A) and (B) are each a partially fragmentary sectional view of an embodiment of the scan head of the bar code scanner according to the present invention, FIG. 1(C) being a front view of the scan head.
Figure 10A:
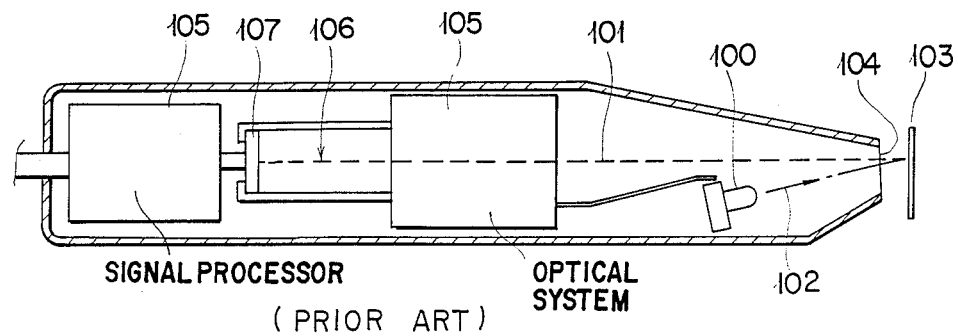
FIGS. 10(A) and (B) are each an explanatory view of the prior-art bar code scanner.
Figure 10B:
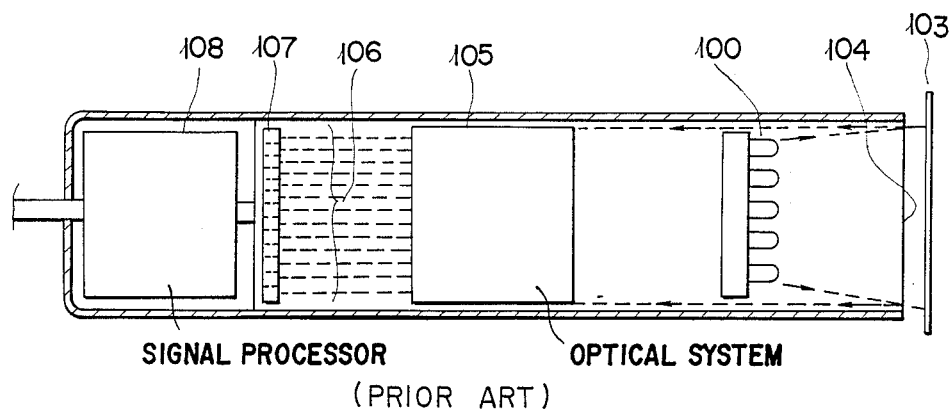

FIGS. 1(A) and (B) are partially fragmental sectional views showing the side and top of one embodiment of a scan head 1 of the inventive bar code scanner. The internal structure and operating principle of this scan head 1 are similar to those having been described with reference to FIGS. 10(A) and (B), and they are not the subject of the present invention; therefore, they will not be described herein, but the shape of the scan head 1, subject of the present invention, will be explained.

The scan head 1 is sheathed, except for a opening 3, with a lightproof enclosure 2 made of plastic plate or the like by molding. For the simplicity of explanation, the front end of the scan head 1 which faces a bar code label 4 and the gripping portion opposite to the front end will be separately discussed with a neck 21 taken as the boundary between them. Note, however, that this separation is never as external and functional one.

The gripping portion has a rectangular section of H in height and L1 in width and is rounded at edges so as to be easy to grip.

Figure 1B:
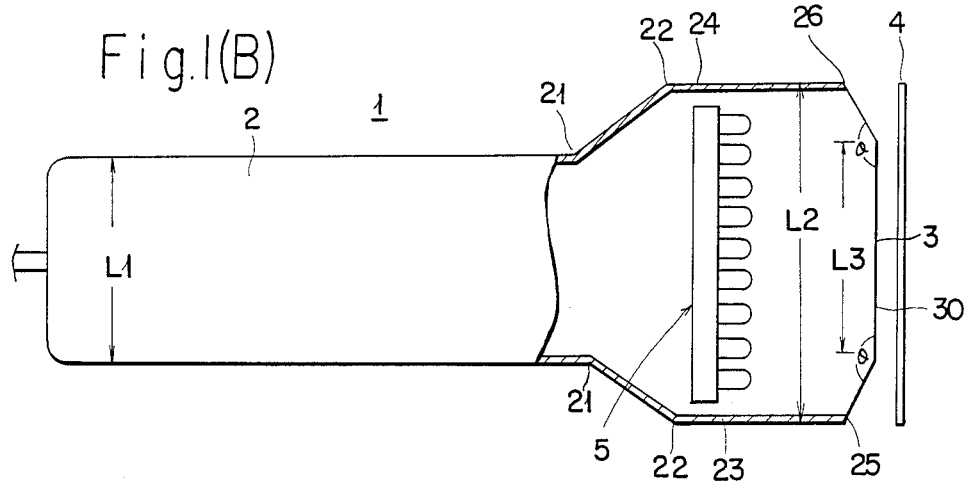

As shown in FIG. 1(B), a front left member 23 and a front right member 24 of the enclosure 2 are bent at the neck 21 so as to extend away from each other, and then bent back both at a bending point 22 so as to be parallel to each other and also to the gripping portion. Here, the enclosure 2 has also a rectangular section of which a width is L2. The width L2 is larger than the maximun size of bar code label 3.

The left and right members 23 and 24 are terminated at the points 25 and 26, respectively (in FIG. 1(B)), while an upper member 27 and a lower member 28 are terminated at the points 29 and 30, respectively (in FIG. 1(A)).

The upper and lower members 27 and 28 have their respective front left and right portions cut at an obtuse sweepback angle $\theta$, with the central portion of L3 in width left as it is, so that their left and right ends meet the ends 25 and 26 of the left and right member 23 and 24. The width L3 is selected based on the standard length of bar code.

Figure 1C:
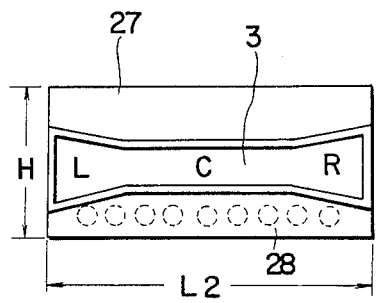

FIG. 1(C) is a view, from the front (the bar code label 4), of the opening 3 formed as in the above. The opening 3 is formed by the central portion C, left portion L and right portion R as shown in FIG. 1(C). The left and right portions join the central portion C at a sweepback angle $\theta$ with respect to the latter. The light from a light source 5 is projected to the bar code label 4 through the opening 3, and the reflected light from the bar code label 4 is picked up also through the opening 3. When the bar code label 4 is smaller than the standard type one, it should be brought so as to face the central portion C. As seen from FIG. 1(C), the central portion C is easily discernible due to the sweepback angle $\theta$. Also this sweepback angle $\theta$ can be easily sensed as felt by the hand gripping the scan head when the opening 3 is in direct contact with the bar code label 4. Therefore, the bar code can be scanned with the opening 3 correctly placed facing the bar code 4 correspondingly to the size thereof.

Figure 2A:
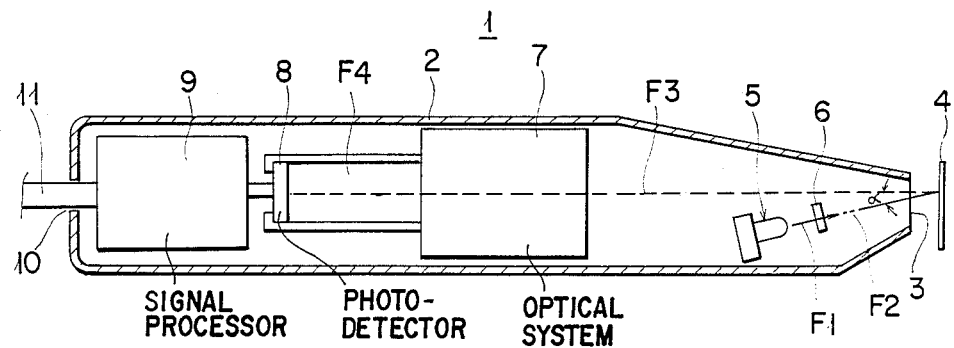
FIGS. 2(A) and (B) are each a sectional view of another embodiment of the present invention in which distribution of luminance is corrected.
Figure 2B:
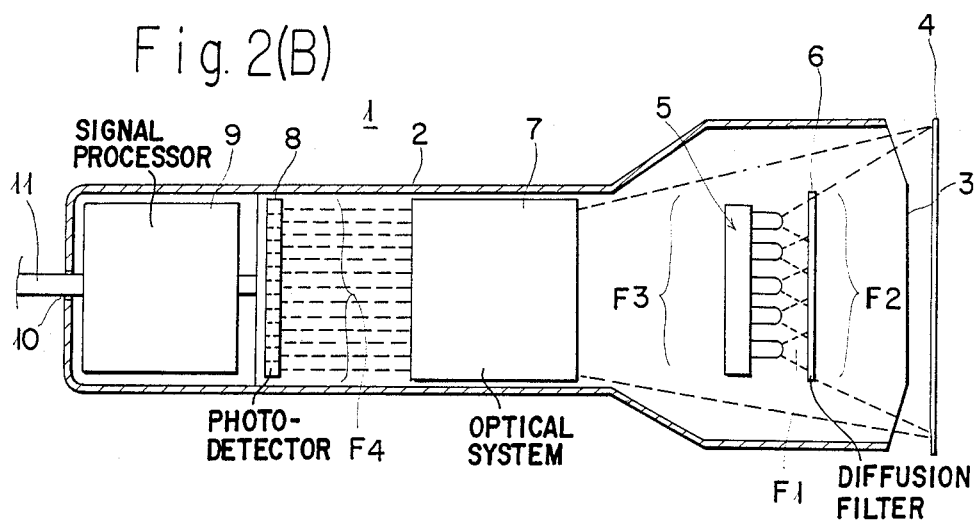

FIGS. 2(A) and (B) show an embodiment of the bar code scanner according to the present invention, using a light scattering filter for correction of the luminance distribution. The enclosure 2 may consist of an upper and a lower cases made of plastic plate or the like by molding and which have each a U-shaped section, and it may be formed by bonding the upper and lower cases to each other after all the necessary internal components of the scan head 1 are incorporated therein. Furthermore, as shown in FIG. 2(B), the front end portion of the enclosure 2 is expanded toward the bar array of the bar code, thus expanding the opening 3. This arrangement is intended for coping with all of different sizes of the bar code label 4.

In the above-mentioned lightproof enclosure 2 are installed the light source 5 for illuminating the bar code label 4, a diffusion filter 6, an optical system 7, a photodetector 8, and a signal processor 9 of which the output is connected to a computer (not shown) by a connecting line 11 through a through-hole 10 formed in the center of the back end of the enclosure 2.

Figure 3:
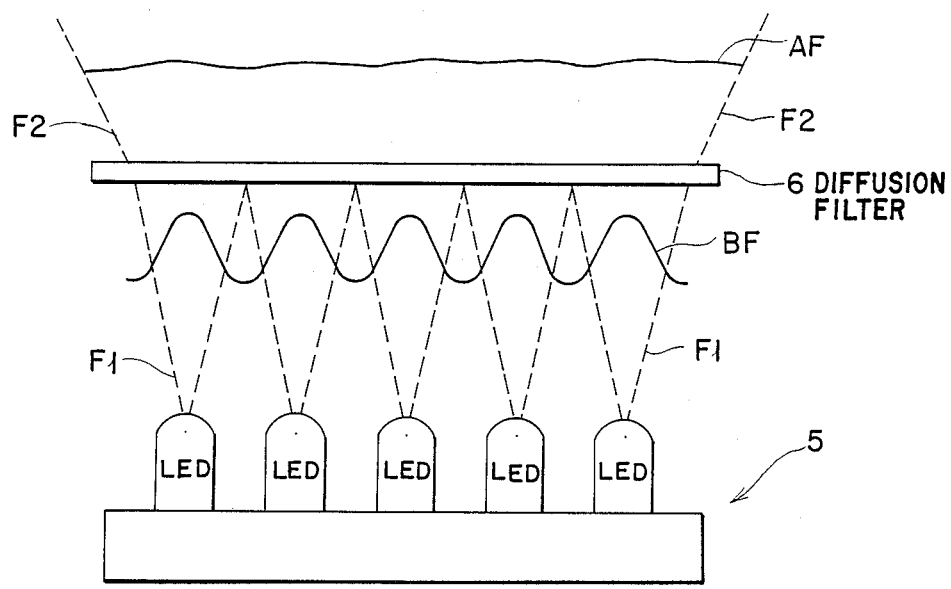
FIG. 3 is an explanatory illustration of the luminance distribution concerning the embodiment in FIGS. 2(A) and (B)

The light source 5 is a linear array of plural LEDs. The number of LEDs used is determined taking account of the volume of the scan head end, brightness and directionality of each LED, etc. As shown in FIG. 2(A), the light source 5 is installed at an angle $\alpha$ between an optical axis of light projection F1 and an optical axis of light reception F3, so the reflected light is not intercepted. The diffusion filter 6 is provided between the light source 5 and opening 3 with its plane placed at a position off the optical axis of light reception F3, perpendicularly to the optical axis of light projection F1 and parallel to the front face of the assay of LEDs. The light along the optical axis of light projection F1 will pass through the diffusion filter 6 to form scattered light F2. The luminance distribution change due to such disposition of the light source 5 and diffusion filter 6 is shown in FIG. 3. In this Figure, each LED of the light source 5 has a high brightness and directionality. Therefore, the luminance distribution of the light beams from these LEDs represents a wave as indicated at BF, and it will remain the same on the surface of the bar code label 4 if the diffusion filter 6 is not provided. AF indicates the luminance distribution after the light has passed the diffusion filter 6. As seen, this luminance distribution is uniform.

Owing to the diffusion filter 6 thus provided, the luminance on the surface of the bar code label 4 is uniform with the result that the reflected lights from the bars of the bar code will also be uniform. The reflected lights F3 pass through the optical system 7 composed of lenses where they are converted into parallel light beams F4 which will be picked up by the photodetector 8.

The photodetector 8 comprises a necessary number of photodetecting elements disposed in line correspondingly to the number of bars in the bar code, or it is a CCD image sensor. The electric signal resulted from photoelectric conversion by each photodetecting element is sent to the signal processor 9 where it is processed into a digital signal which in turn will be sent to the computer via the connecting line 11.

Figure 4A:
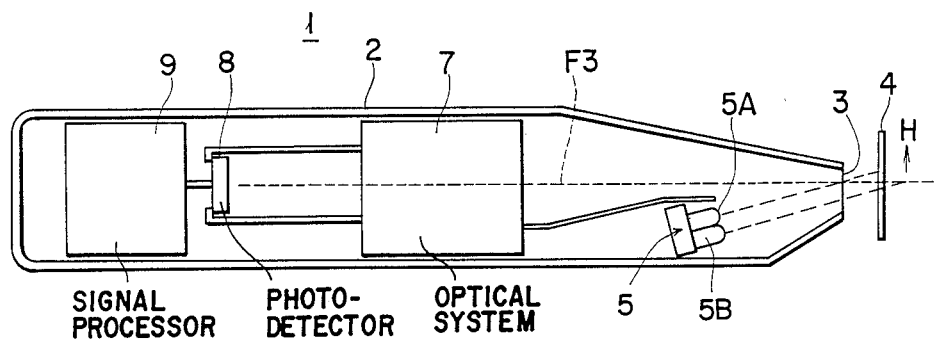
FIGS. 4(A) and (B) are a side elevation and top view, respectively, of an embodiment of the light source of the inventive bar code scanner.
Figure 4B:
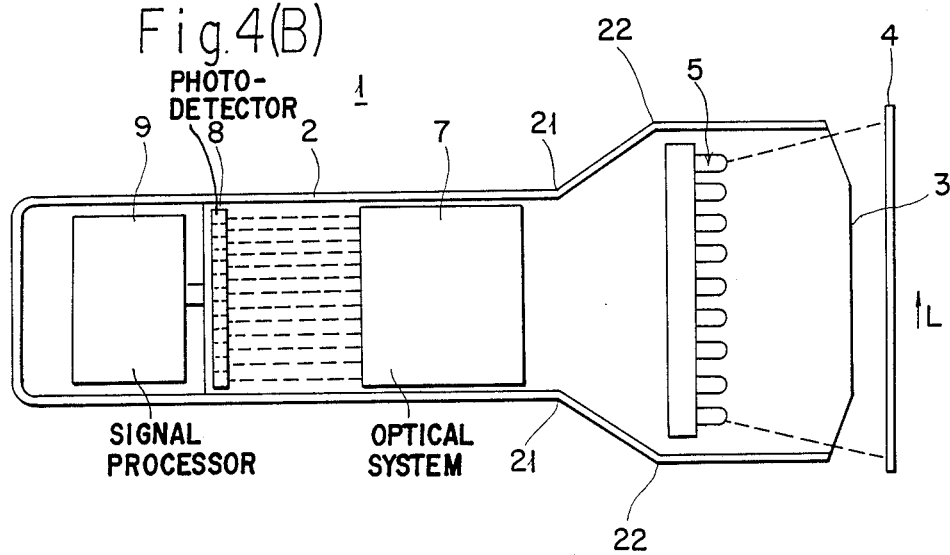

FIGS. 4(A) and (B) show an embodiment of the scan head, and more particularly, the light source, according to the present invention. FIG. 4(A) is a side elevation of the same while FIG. 4(B) is a sectional, top view. The scan head 1 is sheathed wholly by the lightproof enclosure 2, except for the opening 3. For the simplicity of explanation, the scan head 1 will be discussed as divided into the front end portion and gripping portion. However, this division is not an external and functional one. The light source 5 is installed inside the front end portion in such a manner that the optical axis of light projection of each light emitting element forms a predetermined angle with the axis of light reception F3, for thereby preventing the light source 5 from intercepting the reflected light from the bar code label 4.

The light source 5 will be described later. The reference numeral 7 denotes the optical system, 8 the photodetector and 9 the signal processor.

The light projected from the light source 5 impinges upon, and is scattered by, the bar code printed on the surface of the bar code label 4. Among these scattered light beams, those entering through the opening 3 are converted by the optical system 7 into parallel beams which are transmitted to the photodetector 8. The photodetector 8 is composed of a linear array of photodetecting elements in a corresponding number to that of the bars in the bar code. Thus, the intensity of light beam detected by each photodetecting element is converted into an electrical signal indicative of the thickness of each bar of the bar code. The electrical signal from each photodetecting element is transmitted to the signal processor 9 where it is processed for identification of the bar code. The output of the signal processor 9 may be led to a display (not shown) on the scan head 1 or led by a conductor (not shown) to the computer 5 where it will be subject to a more advanced processing.

The light source 5 consists of an upper one 5A and lower one 5B, each of which is a linear light source formed by LEDs arranged as appropriately spaced, the LEDs being each of a high brightness and directionality (see FIGS. 4(A) and (B)). The upper and lower light sources 5A and 5B may be disposed so that their respective LEDs are vertically superposed on each other as shown in FIG. 5(A), or so that the LEDs are staggered as shown in FIG. 5(B). Also, the light sources may include an intermediate one 5C or more light source stages, not limited to the two stages of light sources, as shown in FIG. 5(C).

Figure 11A:
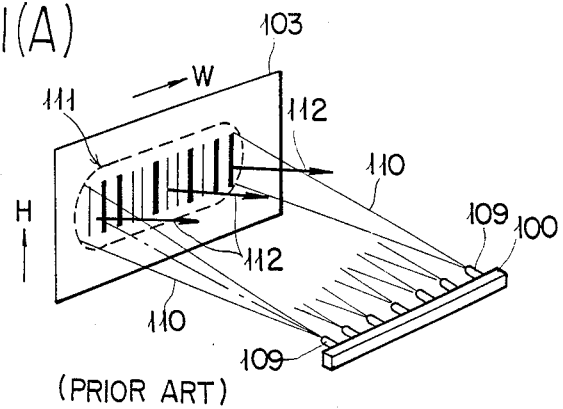
FIGS. 11(A) and (B) show the relation between the illuminated area on the prior-art bar code label and the maloperation.
Figure 11A:
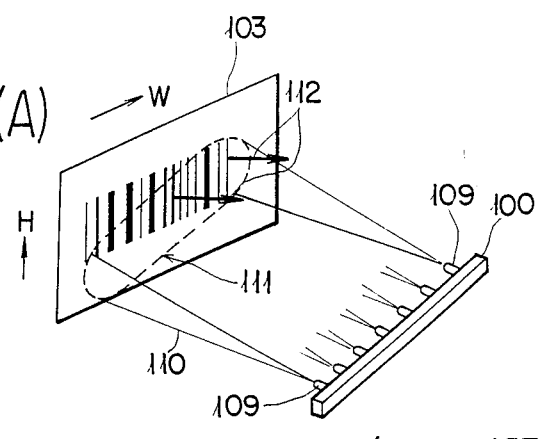
Figure 12:
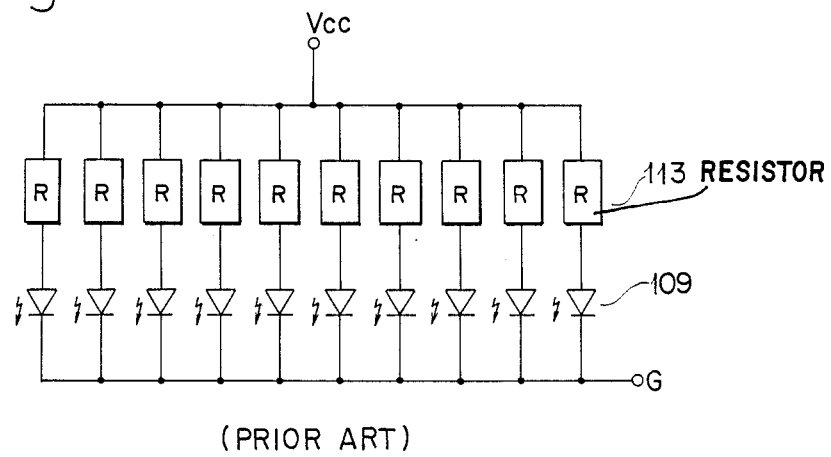
FIG. 12 is a circuit diagram of a prior-art light source.

The area on the bar code label 4 and which is illuminated by such array of plural light sources is shown in FIG. 6. As apparent from comparison of FIG. 6 with FIG. 11(B), scanning error is minimized since the illuminated area covers all the bars of a bar code even when the scan head is inclined.

Figure 7:
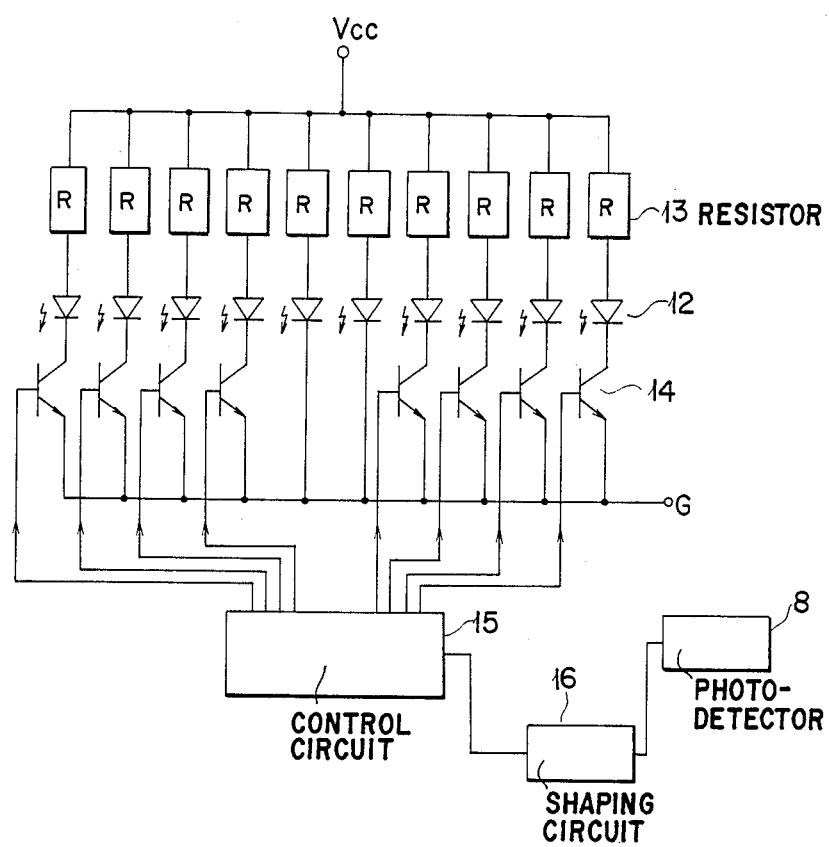
FIG. 7 is a circuit diagram showing the embodiment of a controller for the light source in the inventive bar code scanner.

FIG. 7 is a circuit diagram showing an example of a configuration of the light source of the inventive bar code scanner. In the Figure, the reference numeral 12 denotes a light emitting element. In this embodiment, the light emitting element 12 is a light emitting diode (LED). Ten such LEDs are arranged as regularly spaced in line. The two LEDs at the center are always turned on, and other eight LEDs are limited in on/off operation. The numeral 13 indicates a current limiting resistor element connected in series to each of the LEDs 12. The reference numeral 14 denotes a switching element, a transistor in this embodiment, to turn on and off the light emitting element 12. One transistor 14 is connected to each of the LEDs 12, except for the two at the center. The reference numeral 15 indicates a control circuit having a function to sense, from a signal output resulted from the photoelectric conversion by the photodetector 8 of the reflected light from the LEDs 12 which are normally on, when the bar code label is near the scan opening, and a function to produce an on/off control signal for the switching element 14. That is, when an object near the scan opening is judged to be a bar code, the control circuit 15 works to turn on the light emitting elements 12 for a time required to scan the bar code and to turn off the light emitting elements 12 other than those for sensing the proximity to a bar code when the time necessary for scanning the bar code has passed. The photodetector 8 is a linear array of CCD image sensors or plural semiconductive photodetecting elements. The reference numeral 16 indicates a shaping circuit which shapes a waveform indicative of the density of a bar code photoelectrically converted by the photodetector 8 into a rectangular wave which is supplied as input to the control circuit 15.

Figure 8A:
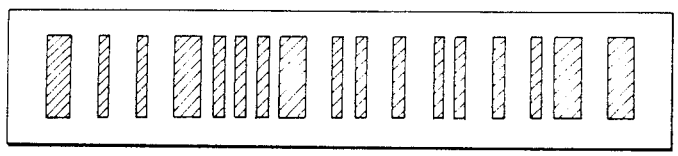
FIG. 8(A) is a plan view showing one example of a bar code.
Figure 8B:
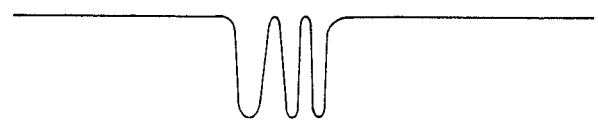
FIG. 8(B) is a judgement waveform in scanning in the embodiment in FIG. 7.
Figure 8C:
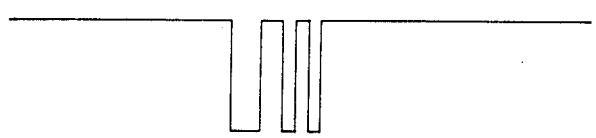
FIG. 8(C) is a waveform of judgement in scanning by the bar code scanner, after shaped into rectangular waveform.

FIG. 8(A) shows the bar code surface, FIG. 8(B) is a waveform of the output from the photodetector 8 when the bar code is illuminated by the proximity sensing LEDs 12, and FIG. 8(C) is a shaped waveform of the photoelectrically converted output of the photodetector 8 shown in FIG. 8(B). A shaped rectangular wave signal supplied to the control circuit 15 is compared with the bar code data at the center of a bar code memorized in the control circuit 15, and if the signal is the same as the data, it is judged to be the bar code.

In the above-mentioned embodiment, ten LEDs 12 are used including two normally-on LEDs and they are disposed as regularly spaced. However, the present invention is not limited to this embodiment, but the number of LEDs and the number and arrangement of the normally-ON LEDs for sensing the proximity of bar code may be subject to appropriate variations.

Figure 9A:
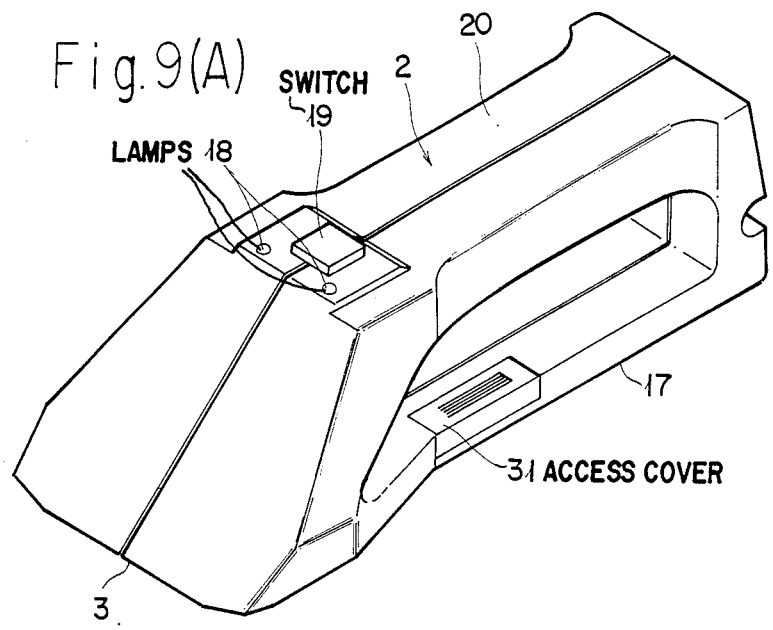
FIG. 9(A) is a perspective view of the case of the inventive bar code scanner.
Figure 9B:
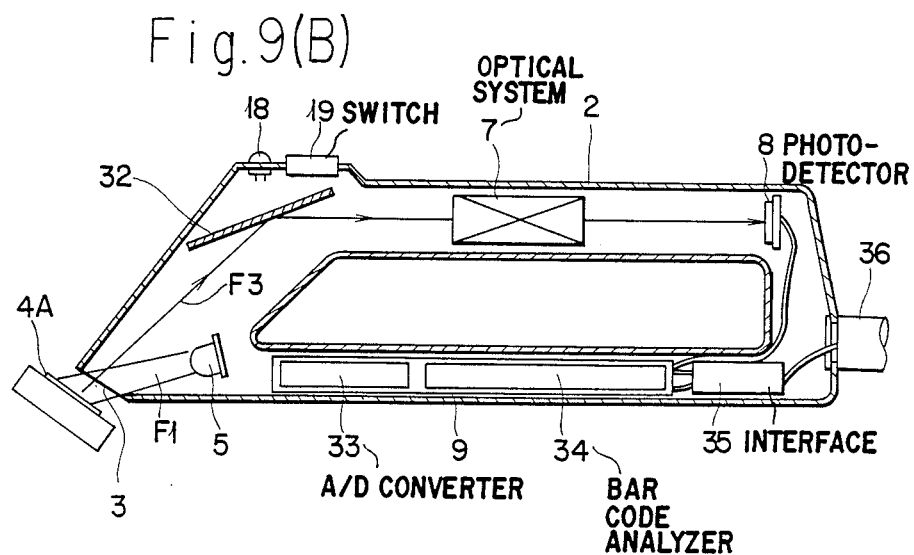
FIG. 9(B) is a longitudinal sectional view of the same.

FIG. 9(A) is a perspective view showing the external view of the enclosure 2 of another embodiment of the inventive bar code scanner. In this Figure, the reference numeral 3 indicates an opening formed at the lower front end and which serves as a path for projected and reflected beams of light, 20 a handle-shaped grip for using the bar code scanner as held by hand, and 17 a flat bottom for using the bar code scanner as a stationary type. The reference numeral 18 denotes a scan checking lamp, 19 a manual start switch to start the scan of a bar code, and 31 a switch access cover which is to be detached when operating various switches provided inside the enclosure. Two scan checking lamps 18 are provided to discriminate definitely whether the intended scan has been done successfully or not. FIG. 9(B) is a sectional view of the inventive bar code scanner. In this Figure, the reference numeral 5 indicates a light source in which a plurality of, for example, LEDs is disposed parallel to the bar code surface 4A so as to evenly illuminate the latter. F1 denotes a projected light (optical axis of light projection) which illuminates the bar code surface 4A, F3 is a reflected light (optical axis of light reception) from the bar code surface 4A, 32 is a mirror to forward the reflected light F3 in a predetermined direction, 7 an optical system to collect the reflected light F3, 8 a photodetector (photoelectric transducer), for example a CCD image sensor, and 9 a signal processor (decoder). This signal processor consists of an A/D converter 33 which shapes the electrical signal photoelectrically converted by the photodetector 8 and converts it into a digital signal, and an analyer 34 to analyze the bar code information from the digital signal. The reference numeral 35 denotes an interface used to transmit the data from the signal processor 9 to an external device (host computer, not shown), and 36 an input-/output cable which connects the interface 35 and the external device to each other. Further, there are provided, but not shown, inside the enclosure 2 a change-over switch to make usable the bar code scanner for scanning bar codes of various kinds and numbers of digits, and also a switch to select conditions of interfacing with the external device; thus, the bar code scanner is wholly housed in a single enclosure.

Since the inventive bar code scanner has the enclosure 2 shaped as shown in FIG. 9(A), bar code scanning can be easily done whether the scanner is used as hand-held type or stationary type.

In the embodiments described in the foregoing, a signal processor, etc. in addition to the optical system are all housed in a single enclosure. However, the present invention is not limited to these embodiments, and the signal processor and interface may be housed in another enclosure separately from the scan head. In effect, an enclosure is used which is so designed as to permit the use of the bar code scanner as a hand-held type or stationary type as desired, and it may contain at least the optical system (light source, lens system and photoelectric transducer).

As described in the foregoing, the bar code scanner according to the present invention has an opening of a unique shape which permits the scanning easily and correctly, of any bar code of various length from the maximum to minimum without the necessity of any special operation.

Since the structure is so simple and easy to manufacture, the manufacturing costs can be remarkably reduced. Also, when a light source using an array of LEDs is used in the bar code scanner, a diffusion filter is disposed in front of the light source to equalize the luminance of the light beams passing through it.

Consequently, the reliability can be improved since it is possible to prevent any failure in scanning the bar code due to nonuniform distribution of luminance which is likely to occur when high directionality LEDs are used, and also since it suffices to use only a small number of high brightness LEDs, the structure can be made compact and the power consumption be effectively reduced. In addition, with a bar code scanner using a light source with LEDs disposed in plural lines, no scanning error occurs even if the scan head is somewhat tilted in relation to the bar code under scanning. Thus, the scan speed can be raised and the working fatigue is less because no utmost care has not to be paid for the geometrical relation of the scan head to the bar code, so the scanning throughput is remarkably improved. Furthermore, the light source according to the present invention consists of plural light emitting elements disposed in line, of which only a few are normally trurned on to sense the existence of a bar code. When the existence of a bar code is detected, all the light emitting elements are turned on and a bar code scan is started. This arrangement makes it unnecessary to operate any on-off switch of the light emitting elements each time the scan head is brought near the bar code, so the operator's annoyance in operation and fatigue in working can be considerably reduced. Also since it is not necessary to always keep the light emitting elements energized, the power consumption can be further smaller than ever. Since the external shape of the bar code scanner enclosure is of a unique design so that the scanner can be used as a handheld type or stationary type for use on the table top or bench, bar code scanning can be easily done by the operator, whether standing or sitting. Also, the decoder, interface, etc. together with the optical system, namely, the whole bar code scanner, can be housed in a single enclosure, so a very compact apparatus can be provided.

What is claimed is:

1. A bar code scanner, housed in a lightproof enclosure at one end of which an opening is formed, said scanner having a scan head for illuminating a bar code facing said opening from a light source disposed inside said opening, a photodetector provided within said enclosure and positioned to receive light reflected from a bar code in front of said opening, said photodetector comprising a CCD image sensor or a plurality of photodetecting elements, said photodetector converting the light into an electrical signal, and means for processing the electrical signal, for thereby identifying said bar code,
said opening of the scan head being defined by a straight front central portion of said enclosure and right and left lateral portions, said right and left lateral portions joining the opposite ends, respectively, of the front central portion at an obtuse sweepback angle.

2. A bar code scanner, housed in a lightproof enclosure at one end of which an opening is formed, in which a bar code facing said opening is illuminated from a light source consisting of high brightness and directionality LEDs and which is so located inside said opening that an optical axis of light projection intersects obliquely an optical axis of light reception, a photodetector provided within said enclosure and positioned to receive light reflected from a bar code at said opening, said photodetector comprising a CCD image sensor or a plurality of photodetecting elements, and means for processing an electrical signal from said photodetector to identify said bar code.
a high light transmission diffusion filter interposed between said light source and opening and parallel to the front face of said light source.

3. A bar code scanner, housed in a lightproof enclosure at one end of which an opening is formed, having a scan head which illuminates a bar code facing said opening from a light source disposed inside said opening, a photodector provided within said enclosure and positioned to receive light reflected from a bar code at said opening, said photodetector comprising a plurality of CCD image sensors or photodetecting elements, said photodetector converting the light into an electrical signal, and means for processing the electrical signal, for thereby identifying said bar code,
said light source being a plural-array type comprised of a plurality of linear light sources comprising a plurality of high brightness and directionality spot light sources disposed with predetermined spacings in a line, said linear light sources being arranged in a plurality of rows in a single plane, whereby the illuminated area covers all the bars of a bar code independently of the inclination of the scan head to the bar code.

4. A bar code scanner in which a reflected light from a bar code surface is detected by a photodetector to recognize the data, having a light source for illuminating the bar code surface, said light source comprising:
a plurality of light emitting elements forming a linear array of light emitting elements;
a plurality of resistor elements connected to said light emitting elements, respectively, to limit the amount of current flowing through said respective light emitting elements;
switching elements connected in series with determined ones of said light emitting elements, respectively, whereby at least one of said light elements is normally continually energized;
a control circuit to turn on and off said switching elements;
said light emitting elements which are normally energized being used for sensing the proximity to a bar code, said control circuit being connected to receive the output signal from the photodetector in response to the reflected light from said normally energized light emitting elements and outputting, when the proximity to the bar code is recognized, a control signal to turn on said switching elements for a predetermined length of time, whereby when the proximity to the bar code is detected by the normally energized photodetector, all the light emitting elements are turned on to scan the bar code.

5. A bar code scanner, comprising a light source to illuminate the surface of a bar code, an optical system to collect the scattered light on the bar code surface, a photoelectric transducer to convert the light collected by said optical system into an electrical signal, a decoder to shape the waveform of the electrical signal thus photoelectrically converted and analyze the information such as figures and letters expressed by the bar code, and an interface to interface the data from said decoder with an external device;

said bar code scanner further comprising a scan head enclosure enclosing at least said light source, optical system, and photoelectric transducer, said enclosure being portable and being provided at one end thereof with an opening serving as the path for the projected light and reflected light, said enclosure having a central through hole and also a gripping portion for handling said scan head when it is held by hand, said gripping portion extending from the top of said enclosure to the upper portion of said horizontal through hole; said enclosure further having a flat bottom for using said scan head as a fixed device, said flat bottom is provided under the lower portion of said horizontal through hole and defining the lowermost portion of said scanner, whereby the bar code can be scanned by the bar code scanner either when it is held by the hand or is fixed.

6. A bar code scanner as set forth in claim 5, said enclosure housing also the decoder and interface.

* * * * *